United States Patent [19]

Conte, Jr. et al.

[11] Patent Number: 5,091,203
[45] Date of Patent: Feb. 25, 1992

[54] METHOD FOR REMOVING CHOLESTEROL FROM EGGS

[75] Inventors: Joseph A. Conte, Jr., Waterford; Bobby R. Johnson, Cherry Hill; Rudolf J. Hsieh, Mt. Laurel; Sandy S. Ko, Collingswood, all of N.J.

[73] Assignee: Campbell Soup Company, Camden, N.J.

[21] Appl. No.: 444,198

[22] Filed: Dec. 1, 1989

[51] Int. Cl.$^5$ ............................................. A23L 1/32
[52] U.S. Cl. .................................. 426/614; 426/417; 426/480
[58] Field of Search ............ 426/614, 417, 429, 480, 426/490

[56] References Cited

U.S. PATENT DOCUMENTS

| | | | |
|---|---|---|---|
| 3,563,765 | 2/1971 | Melnick | 426/614 |
| 3,594,183 | 7/1971 | Melnick et al. | 426/573 |
| 3,717,474 | 2/1973 | Fioriti et al. | 426/614 |
| 3,881,034 | 4/1975 | Levin | 426/541 |
| 3,941,892 | 3/1976 | Glasser et al. | 426/104 |
| 4,103,040 | 7/1978 | Fioriti et al. | 426/614 |
| 4,104,286 | 8/1978 | Fallis et al. | 552/545 |
| 4,234,619 | 11/1980 | Yano et al. | 426/614 |
| 4,296,134 | 10/1981 | Boldt | 426/250 |
| 4,333,959 | 6/1982 | Bracco et al. | 426/614 |
| 4,714,571 | 12/1987 | Tremblay et al. | 260/403 |

FOREIGN PATENT DOCUMENTS

| | | |
|---|---|---|
| 2751392 | 5/1978 | Fed. Rep. of Germany . |
| 54-61200 | 5/1979 | Japan . |
| 60-55095 | 5/1985 | Japan . |

OTHER PUBLICATIONS

Fennema, O. R., Food Chemistry, 1985, pp. 167, 172, 830, 846, 847, 850 and 851, Marcel Dekker, Inc., N.Y.
Folch, "A Simple Method for the Isolation and Purification of Total Lipides from Animal Tissues," J. Biol. Chem., 226(1), pp. 497-509 (May, 1957).
Washburn, "A Rapid Technique for Extraction of Yolk Cholesterol," Poultry Sci., 53(3), pp. 1118-1122 (May, 1974).
Ramesh, "Selective Extraction of Phospholipids from Egg Yolk," J. Am. Oil Chem. Soc., vol. 56, pp. 585-587 (May, 1979).
Hatta, "Separation of Phospholipids from Egg Yolk and Recovery of Water-Soluble Proteins," J. Food Sci., 53(2), pp. 425-427, 431 (1988).

Primary Examiner—Donald E. Czaja
Assistant Examiner—Leslie Wood
Attorney, Agent, or Firm—Banner, Birch, McKie & Beckett

[57] ABSTRACT

Edible oil containing monoglyceride is emulsified with a mixture of cholesterol-containing egg in aqueous solution. Then, the mixture is heated and typically is stirred gently to ensure intimate admixture of the oil phase in the aqueous phase. The monoglyceride serves to facilitate oil/lipoprotein interaction in the presence of aqueous phase. The fat in the egg is partitioned into the monoglyceride-containing oil phase. Agitation is continued for a time sufficient to exchange or extract cholesterol and fat from the aqueous phase to the oil phase. The cholesterol- and fat-reduced aqueous phase is the desired low-cholesterol egg product, and is separated from the cholesterol-enriched oil phase.

20 Claims, No Drawings

METHOD FOR REMOVING CHOLESTEROL FROM EGGS

BACKGROUND OF THE INVENTION

1. Field of the Invention

This invention relates to a method for removing cholesterol from eggs or egg yolks. More particularly, this invention relates to a method for removing cholesterol from eggs or egg yolks by extracting the cholesterol with monoglyceride-supplemented oil.

2. Description of Related Art

Eggs, especially chicken eggs, are a popular and desirable component of the human diet. In particular, the nutritive quality of the protein content of eggs is valued. Eggs are organoleptically pleasing and useful in various manners and methods of food preparation.

Liquid whole egg consists, on the average, of about 64 percent white and about 36 percent yolk. The white contains approximately 12 percent solid matter of a primarily proteinaceous nature. The yolk contains about 50 percent solids, of which a major portion is fat and a lesser portion is protein, the fat and protein being present in approximately a 2:1 ratio. A large proportion of the fat appears to be bound to the protein in the form of lipoprotein complexes. Some of this lipid is easily extractable with fat solvents, such as hexane, and this portion of the lipid is conventionally called "free lipid." It is also referred to as "free fat." The remaining lipid typically is referred to as "bound fat." It can be extracted, but only under more rigorous conditions. The term "fat" is used here, in connection with egg yolk, to refer to both kinds of fat, in a generic sense.

Egg white or egg albumen is essentially an aqueous solution of proteins containing small amounts of other materials such as minerals and sugars, and only a trace of fat. The egg yolk, on the other hand, contains virtually all of the fat and cholesterol of whole eggs. These latter components are present in combination with egg yolk proteins as complex lipoproteins. Consequently, many of the functional properties and nutritional aspects of the egg reside specifically in the yolk portion. This is evidenced by the incorporation of yolk alone as an ingredient in many basic food formulations.

Eggs contain a significant quantity of cholesterol and there is evidence that cholesterol from eggs may raise human serum cholesterol level more than an equivalent quantity of cholesterol from another source. Medical evidence relates high serum cholesterol levels to disease of the vascular system. Thus, despite the organoleptic appeal and nutritive value of eggs, consumers are becoming reluctant to eat eggs in any form.

Various methods have been proposed for removing cholesterol from eggs or egg yolks to produce a low-cholesterol egg product. However, typically these methods significantly alter the other properties of eggs thus treated, destroying the suitability of the egg for use in traditional cooking processes and making the low-cholesterol product organoleptically unsatisfactory.

Some methods produce a solid product. One such method is disclosed in U.S. Pat. No. 3,563,765, wherein "free fat" is extracted from dry egg yolk solids by mixing the solids with solvent and heating the mixture to a temperature below 160° F., preferably below 120° F., to avoid denaturation of the protein. A non-polar solvent such as hexane is preferred to extract lipids and cholesterol from the outer layer of protein, phospholipids, and cholesterol which surrounds the lipid core. Some fats are removed by the extraction. The extracted solids must be heated to remove, by distillation, any solvent which remains in the egg solids.

Methods of replacing fat thus extracted typically incorporate addition of unsaturated fats so as to improve the ratio of polyunsaturated fats to saturated fats in egg products produced. For example, U.S. Pat. No. 3,594,183 discloses a method for replacing the fats in a solid, low-cholesterol, egg-containing product by combining low-cholesterol egg yolk with unsaturated oil. The patent also discloses a method for preparing an egg food product comprising the re-fatted yolk solids.

Methods for producing low-cholesterol solids from liquid egg also are known. For example, U.S. Pat. No. 3,881,034 discloses that cholesterol and free fat can be removed from liquid whole egg by mixing egg with water and an organic solvent for fat. The solvent is selected so that, during distillation separation of the solvent and fat dissolved therein from the egg product, the solvent forms an azeotrope with water at a temperature less than about 140° F. Thus, the free fat and cholesterol are extracted from the egg fluid into the solvent, and the solvent and water are distilled off to leave dry egg powder which is free of cholesterol and of free fat.

Many practitioners find such solvent extraction objectionable because the extraction requires use of organic solvents, which must be separated from the egg product at a temperature less than 140°-160° F. to avoid thermal denaturation of the egg proteins. Many solvents denature egg protein when extracting lipids from lipoprotein complexes. Denaturation of the egg protein degrades the organoleptic properties and qualities of the resultant product. The solvent also must be suitable for contact with food stuffs. Small quantities of solvent may remain in the egg product, even though the most stringent measures have been taken to remove the solvent. Remaining solvent is objectionable to many consumers, not only because of the health risks solvents are perceived to present, but also because solvents degrade the organoleptic properties of the product.

A method said to remove cholesterol from dried egg powder (whole egg or yolk) without leaving solvent residue in the egg product is disclosed in U.S. Pat. No. 4,104,286. Dry egg powder is contacted with an aqueous ethanol solution (typically 95 percent ethanol) which extracts free fats and cholesterol from the egg powder. The low-cholesterol, low-fat powder is separated from the aqueous solution, which now contains fats and cholesterol. The aqueous solution is further treated to saponify fatty acids, and cholesterol and saponified fatty acids are separately recovered.

Vegetable oil has been utilized to extract cholesterol from egg. For example, U.S. Pat. No. 3,717,474 discloses that cholesterol can be extracted from liquid egg yolk simultaneously with addition of unsaturated fats thereto by using high shear agitation to emulsify and ensure contact between the liquid egg yolk and the unsaturated oil. The patent discloses that high energy mixing is required throughout the treatment to disrupt the water barrier surrounding the yolk fat globules which contain the saturated fat and cholesterol to be extracted. Disruption of the barrier affords the opportunity for the yolk fat droplets and the solvent oil droplets to come into intimate contact. The period of high shear agitation, which is necessary to ensure that the barrier is disrupted, must be shorter than the time required for the heat generated by the agitation to raise the temperature of the mixture being agitated to the temperature at which egg protein becomes denatured.

In the method described in U.S. Pat. No. 4,333,959, the pH of liquid egg yolk is reduced to a value not below three, preferably between about four and six, to both destabilize and reduce the viscosity of the yolk. Then, the destabilized emulsion is treated with edible oil to form a fine dispersion and extract fat and cholesterol from the yolk droplets. The dispersion is formed by homogenization in an agitator mill utilizing the microballs, in a high pressure homogenizer, or by intense vibration such as that used in continuous disintegrators. The dispersion then is centrifuged to separate low-cholesterol egg yolk from the oil extractant. The patent further discloses that extraction under the same conditions of shear without reduction of the pH of the yolk produces lower, albeit significant, cholesterol reduction in the yolk.

These methods, although they do not require an organic solvent which is not an edible oil, are not entirely satisfactory, because intense agitation is required to destabilize the yolk and maintain the dispersion of yolk in the oil.

SUMMARY OF THE INVENTION

This invention relates to a method for removing cholesterol from liquid egg or egg yolk. Edible oil containing monoglyceride is emulsified with a mixture of egg in aqueous solution. Then, the emulsion is heated and typically is stirred gently to ensure intimate admixture of the oil phase and the aqueous phase. The monoglyceride serves to facilitate oil/lipoprotein interaction in the presence of aqueous phase. The fat in the egg is partitioned into the monoglyceride-containing oil phase. Stirring is continued for a time sufficient to exchange or extract cholesterol and fat from the aqueous phase to the oil phase. The cholesterol-and fat-reduced aqueous phase is the desired low-cholesterol egg product, and is separated from the cholesterol-enriched oil phase.

DETAILED DESCRIPTION OF THE INVENTION

This invention is based on the discovery that cholesterol can be extracted from liquid egg products by edible oil without requiring objectionable organic solvents, long periods of high shear mixing of the egg products with the oil, or reduction of the pH to destabilize the yolk. Rather, the inventors have discovered that heating an emulsion of edible oil containing at least about 5 wt percent monoglyceride and liquid egg- or egg yolk-containing aqueous solution is sufficient to remove cholesterol and produce cholesterol-reduced liquid egg or egg yolk product. The monoglyceride serves to facilitate oil/lipoprotein interaction in the presence of an aqueous phase.

As used throughout the specification and claims, the phrase "cholesterol-containing egg" encompasses egg products comprising at least egg yolk, i.e., egg yolk, commercial yolk products, and whole egg. The phrase "cholesterol-containing egg" also encompasses not only chicken egg, but also any cholesterol-containing reptilian or avian egg having a yolk as described above, wherein cholesterol is associated with lipid-containing complexes. Therefore, although the invention is described generally in relation to chicken egg yolk, the invention also encompasses treatment of any cholesterol-containing egg as described herein.

Egg yolk is obtained in any known manner of separating yolk from albumen. Commercial yolk products, such as pasteurized yolks or frozen yolks, also are available. Skilled practitioners recognize that commercial yolk products typically contain about 10 to 20 percent egg white. Such products suitably are treated in the method of the invention.

Skilled practitioners recognize that monoglyceride and any other compounds utilized herein, such as water and edible oil, should have purity sufficient to be utilized in contact with food stuffs. Thus, food-grade monoglyceride, sufficiently pure water, and the like, should be utilized.

As described above, the method of the invention also may be utilized to reduce cholesterol concentration of liquid egg yolk as part of whole liquid egg, i.e., yolk need not be separated from albumen to be treated in accordance with the method of this invention. When thus utilized, the precise proportions of, for example, the quantities of water, monoglyceride-containing oil, or monoglyceride added or the volume of phases which form upon separation, may differ from those described below for treatment of egg yolk. However, a skilled practitioner will be able, with the guidance provided herein, to utilize the method of the invention on whole eggs.

In accordance with the method of the invention, egg yolk first is destabilized to afford the opportunity to remove cholesterol. Destabilization affects the protective structure of the above-described yolk lipoprotein complexes. Fresh yolk, essentially without egg white, or commercially-available yolk (with 10–20 percent egg white) is mixed with about 10 weight percent water at any temperature below about 70° C., i.e., the denaturation temperature of egg protein. Preferably, the temperature is between about 50° and 65° C., more preferably between about 55° and 60° C.

The quantity of water in which the yolk is destabilized is between about 10 and 125 wt percent, based on the weight of the yolk. The desired quantity of water may be added in one or a plurality of stages or dilution steps. Preferably, two dilution steps are utilized, with the quantity of water added in the first step ranging between about 5 and 20 wt percent based on the weight of the yolk, and the quantity of water utilized in the second step ranging between about 10 and 100 wt percent on the same basis. Most preferably, between about 10 and 15 wt percent water is used in the first dilution step, and between about 25 and 75 wt percent water is used in the second dilution step. Dilution of the destabilized yolk in aqueous solution enhances the destabilization thereof by further isolating the destabilized yolk lipoprotein complexes from each other. Excessive dilution is not necessary, however, as it does not significantly enhance destabilization and it dilutes the resulting product.

Preferably, the water in which yolk is first diluted contains salt. Salt aids in destabilizing the lipoprotein complexes and granules, decreases the viscosity of the solution, and increases the solubility of some egg proteins. Each of these effects increases the effectiveness of the cholesterol reduction method of the invention. Thus, although aqueous saline solution is preferred as diluent, acceptable cholesterol reduction can be obtained in accordance with the method of the invention without salt.

Skilled practitioners recognize that the solubility of sodium chloride in water is about 35 grams per 100 grams of water at ambient conditions (20°-25° C.), and increases as the temperature is increased. Any saline concentration may be utilized in the practice of the method of the invention to provide a total quantity of salt of up to about 4 wt percent, based on the weight of the yolk. Preferably, total salt added is between about 0.25 and 3 wt percent, more preferably between about 0.5 and 2 wt percent.

When a plurality of dilution steps is utilized, the yolk solution is stirred for between about 5 and 10 minutes at a temperature below about 70° C., preferably between about 50° and 65° C., and more preferably between about 55° and 60° C., then additional water at a temperature approximately equal to the temperature of the destabilized yolk mixture is added to the yolk mixture. If necessary, the temperature of the diluted mixture is adjusted to between about 50° and 65° C. after dilution and stirring is complete.

The dilute destabilized yolk mixture is mixed with oil containing monoglyceride, preferably the temperature of the mixture is adjusted to between about 50° and 65° C., more preferably to between about 55° and 60° C., and the mixture is emulsified. Emulsification ensures intimate contact between the destabilized yolk mixture and the monoglyceride-containing oil, thus providing a suitable microenvironment in which the monoglyceride is able to facilitate exchange of fat and cholesterol between the egg lipoprotein complexes and the extracting oil during the subsequent treatment steps of the method of the invention, which utilize low-energy, low-shear mixing. Preferably, the emulsion formed is unstable, that is, in the absence of stirring, the emulsion will "break," i.e., form separate aqueous and oil phases, within a few minutes after the emulsion is formed.

Skilled practitioners recognize that, under certain conditions of temperature and relative proportion of oil and aqueous phases, an emulsion may be formed without requiring high-shear, high-energy agitation or an emulsion-forming technique, such as homogenization. Thus-formed emulsions are suitable in the practice of the method of the invention. Under other conditions, however, the emulsion preferably is formed by application of other emulsion-forming techniques, such as homogenization, processing in a colloid mill, and processing in a sonic emulsion-forming device. Skilled practitioners recognize that such techniques typically establish an emulsion significantly more quickly than high-shear agitation.

Homogenization is a preferred method for establishing the emulsion. Typically, homogenization at about 500 psi is suitable to produce the desired degree of emulsification. Homogenization pressure of as much as 3000 psi also is acceptable. The homogenization conditions described produce an unstable emulsion of dilute destabilized egg yolk mixture in monoglyceride-containing oil.

Edible oil to which monoglyceride has been added is utilized in the method of the invention as extractant for cholesterol by partitioning with the fat-containing portion of the egg yolk to extract cholesterol and separate at least a portion of the cholesterol-containing yolk fat from the remainder of the yolk, i.e., the aqueous fraction. Typically, vegetable oils are utilized. These vegetable oils are essentially cholesterol-free and are selected to be organoleptically acceptable in an egg product in quantities which may remain in or be added to the yolk fraction. Suitable oils include sunflower seed oil (also called sunflower oil), conola oil, corn oil, cottonseed oil, soybean oil, safflower oil, rice bran oil, sesame seed oil, and peanut oil. Partially-hydrogenated oils also may be utilized, although some of the benefit from polyunsaturation of the oil is lost. Vegetable oils such as coconut oil or palm oil, also may be used, as they are essentially free of cholesterol. Skilled practitioners recognize other suitable oils which can be utilized in the method of the invention. Blends of oils also may be utilized.

Monoglyceride added to the oil may be derived from the oil, or may be derived from another oil. Conveniently, monoglyceride is purchased commercially. The monoglyceride must meet the purity required of a food stuff, but need not be solely monoglyceride. For example, commercially available distilled monoglyceride comprising about 90 percent monoglyceride, with the remainder related di- and tri-glycerides, is acceptable. Also commercially-available products having 40 percent monoglyceride concentration may be utilized.

The monoglyceride may have a fatty acid moiety of any chain length and melting range below 70° C. Monoglyceride must be fluid at the temperature at which cholesterol extraction is to be affected. A preferred product is an unsaturated monoglyceride with a melting range of 32°-45° C. Such a product, sunflower monoglyceride, is commercially available under the trade name Monodan LS, available from Grindsted Products, Inc. With the guidance provided herein, skilled practitioners will be able to identify other suitable monoglyceride products.

The quantity of oil containing monoglyceride utilized in the practice of the method of the invention typically is between about 0.25 to 5 times the weight of the yolk being treated. That is, 1 kg of yolk is treated with between about 250 g and 5 kg of oil. Similarly, 1 kg of whole egg, containing about 360 g yolk and about 640 g albumen, typically is treated with between about 90 g and 1800 g of oil. A quantity of oil less than about 25 wt percent of the yolk being treated typically does not extract a commercially significant quantity of cholesterol.

Skilled practitioners recognize that the desired level of cholesterol reduction typically is established by commercial criteria, such as by balancing the cost of incremental cholesterol removal against the saleability of the reduced-cholesterol product. In the method of the invention, use of less than about 25 wt percent oil extractant may not provide a commercially suitable degree of decholesterolization. Similarly, use of more than about 5 times, by weight, of oil typically is not economically justifiable. Further, use of a large quantity of extractant can increase product loss as, for example, incomplete phase separation, and require larger vessels and equipment. Preferably, therefore, the quantity of oil utilized is between about 0.5 to 4 times the weight of the yolk being treated; more preferably, between 1 and 3 times, and most preferably, between 1.5 and 2.5 times on the same basis. A plurality of treatments with monoglyceride-containing oil also may be utilized.

The edible oil emulsified with the dilute destabilized yolk suspension contains between about 1 and 40 wt percent monoglyceride, based on the weight of the oil. Preferably, the monoglyceride concentration is between about 2 and 25 wt percent, more preferably between about 6 and 20 wt percent, and most preferably between about 8 and 10 wt percent.

After the emulsion has been established, the degree of agitation need be only low-energy, low-shear stirring sufficient to ensure intimate admixture of the phases and uniformity of temperature. Preferably, foaming and frothing are not induced in the emulsion. Mixing action need only be imparted intermittently, sufficiently often to maintain intimate admixture and uniform temperature. High-energy agitation is not necessary to remove cholesterol from the egg yolk in accordance with the method of this invention. It has been discovered that cholesterol, together with fat, can be removed by monoglyceride-containing oil, which maintains the destabilized nature of the egg yolk and extracts cholesterol and fat from the egg yolk lipoprotein complexes without requiring high shear mixing.

Any stirring method which provides low-energy, low-shear stirring is suitably utilized in the practice of the method of the invention. Typically, the stirring is carried out in a stirred-tank type of vessel. Skilled practitioners recognize that various impellers may be used to stir such a vessel. For example, a propeller may be utilized to provide agitation. However, a relatively small propeller, i.e., one which has a small diameter compared to the diameter of the vessel being stirred, is not preferred in the practice of the method of the invention because such a propeller requires that a high velocity be imparted to the material being stirred. Large diameter axial and radial flow impellers, such as those known as turbines, paddles, anchors, and gates, are preferred because such impellers are operated at lower speed than small-diameter propeller-type impellers. Large-diameter impellers are preferred for the practice of the method of the invention because they provide thorough stirring without high shear.

The emulsion is stirred for a period sufficient to exchange or transfer the desired quantity of cholesterol. Although cholesterol is removed even if the emulsion is broken and the phases are separated almost immediately after the monoglyceride-containing oil is added, typically the emulsion is stirred for between about 5 and 60 minutes, preferably between about 15 and 45 minutes, and more preferably between about 20 and 30 minutes, to increase cholesterol removal. Stirring periods longer than 1 hour typically do not provide proportionate cholesterol reduction and are therefore not preferred.

The aqueous, low-cholesterol product phase of the emulsion is separated from the remainder of the emulsion after the extraction period. Any separation method which does not introduce deleterious compositions into the product may be utilized. Preferably, the phases are separated by either gravity separation or centrifugation.

Gravity separation requires more time than centrifugation, and yields a product which contains more oil than a product obtained by centrifugation. Gravity-settling also is more time-consuming and requires large settling vessels. Therefore, centrifugation is a more preferred phase separation technique.

Low-cholesterol aqueous phase product obtained by centrifugation typically contains up to about 15 wt percent oil, more typically between about 5 and 10 wt percent based on the weight of the product. In contrast, low-cholesterol aqueous phase product obtained by gravity separation typically contains up to about 40 percent oil, more typically between about 10 to 20 percent oil. The relatively higher oil concentration also reduces the effectiveness of the cholesterol removal method because more cholesterol-laden oil remains associated with the aqueous phase product.

Upon centrifugation, the emulsion typically forms 3 distinct phases; the oil phase; a thick, gel-like membrane; and the desired aqueous low-cholesterol product. Membrane does not form under all conditions. The aqueous product phase typically comprises from between about 50 to 99.9 percent, more typically between about 75 to 85 percent of the non-oil phase fraction. Further, the aqueous fraction phase typically contains up to about 20 wt percent, preferably between about 5 and 15 wt percent, and more preferably, between 8 and 12 wt percent, fat and oil.

That fraction of the now-separated emulsion which clearly is distinguishable from both the oil and aqueous phases comprises a film or membrane which is disposed between the aqueous, low-cholesterol product and the remaining oil. The membrane typically comprises between about 40 and 75 wt percent fat and up to about 6 wt percent non-fat solids, such as protein. More typically, the gel-like membrane comprises between about 50 and 70 wt percent, and most typically between about 55 and 60 wt percent, fat.

If fresh yolk essentially without egg white is utilized as starting material, it is desirable to add liquid egg white (albumen) in a quantity sufficient to reduce the viscosity of the mixture. Typically, less than about 25 weight percent albumen is added, based on the weight of the yolk being treated. Preferably, the quantity of albumen is between about 10 and 20 weight percent, more preferably between about 14 and 18 weight percent. The resulting product can be used as a substitute for egg yolk. Further, as noted above, whole egg also may be treated in accordance with the method of the invention; the resulting product is reduced-cholesterol whole egg substitute.

The degree of cholesterol removal is related, inter alia, to the length of the period intimate contact is maintained between the monoglyceride-containing oil and the destabilized egg yolk mixture. A skilled practitioner will be able to select, with the guidance provided herein, a period of stirring sufficient to achieve the degree of cholesterol removal desired. As described above, the degree of cholesterol removal desired often is a business decision based, inter alia, on the value of the resulting product, the cost of raw materials, and the intended use not only of the low-cholesterol egg or egg yolk product but also of the cholesterol, which may be recovered from the non-aqueous phases. Thus, with the guidance provided herein and in view of business circumstances, one may establish the degree of decholesterolization to be achieved.

The aqueous phase, which is the reduced-cholesterol and reduced-fat egg yolk product, can be concentrated to remove water and make the water level more nearly equal to that of natural egg yolk. Concentration methods known to practitioners, including vacuum distillation, by which yolk can be concentrated without denaturing the protein, may be utilized herein. The lipid content of the yolk also may be restored by addition of fat, preferably in the form of essentially cholesterol-free unsaturated oils. Typically, the edible oils utilized as extractant will be suitable for such lipid concentration restoration.

In the method of the invention, the monoglyceride moieties are believed to maintain the destablized nature of the egg yolk globules by facilitating the interaction of the lipid moieties of the lipoprotein complexes of the yolk with the extractant oil. Thus, egg yolks typically comprise, inter alia, lipoprotein moieties, i.e., a lipid moiety surrounded by protein moieties. The protein moieties, which make the lipoprotein soluble in aqueous media, tend to block interaction between the lipid moiety of the lipoprotein and other lipids, e.g., the extractant oil herein. Monoglycerides facilitate this interaction.

The concentration of oil remaining in the aqueous phase is higher when gravity separation of the phases is utilized than when centrifugal separation is utilized. Also, centrifugation enhances the formation of the membrane, which effects additional removal of cholesterol-containing fat from the aqueous fraction. As described above, the membrane comprises oil, monoglyceride, egg phospholipids, cholesterol, protein, and water. Egg protein can be recovered from the membrane by mixing membrane material with a quantities of water approximately at least equal to the weight of the membrane at a temperature of less than 70° C., preferably between about 50° and 65° C., and more preferably between about 55° and 60° C. After mixing for between about 5 and 10 minutes, the mixture is centrifuged. Protein is recovered in the aqueous fraction.

Any additive suitable for food use may be added. For example, color (about 5,500 I.U. beta-carotene per pound of eggs) and other compositions may be added.

The following examples are intended to further illustrate the invention, not to limit it in any way. The invention is limited only by the scope of the appended claims.

EXAMPLES

In each example, the total weight of the fractions recovered was less than the total weight of egg, water, and monoglyceride-containing oil utilized due to water evaporation and handling losses. Therefore, the quantity of product recovered is expressed as percent of recovery. However, cholesterol always is reported in grams to illustrate the quantity of cholesterol in each component.

EXAMPLE 1

Three batches of commercial egg yolks (1000 g) were warmed separately with stirring to a temperature of between 57° and 60° C. To each batch was added 100 g of a 20 wt percent salt solution, i.e., sodium chloride aqueous solution, that had been preheated to 57° C. Each mixture was stirred for about 10 minutes. The solution then was reheated to 60° C. and 500 g of water at a temperature of 55° C. was added to the destabilized yolk mixture with stirring to ensure thorough mixing and uniform temperature. To each dilute destabilized yolk mixture solution was added 2000 g sunflower oil containing monoglyceride. Each aliquot of oil contained a different concentration of distilled sunflower monoglyceride, as described in the table below. The range of monoglyceride concentrations was 0 to 8 percent. After continuing to mix slowly, the oil/egg mixture was homogenized, reheated to 60° C. and stirred gently for 30 minutes. The emulsion then was centrifuged to separate the oil/egg mixture. Cholesterol was measured in the various portions of the centrifuged product by gas chromatography.

The data in Table 1 below summarize the results for tests utilizing 5 and 8 wt percent monoglyceride. When the monoglyceride concentration was less than about 5 percent, the emulsion would not separate and form separate product, membrane, and oil phases. The data in Table 1 illustrate the efficacy of the invention.

TABLE 1

| Monoglyceride Concentration in oil, wt % | 5 | 8 |
| --- | --- | --- |
| Cholesterol in untreated yolk, grams | 10.28 | 9.78 |
| Fractions recovered after centrifugation | | |
| Oil phase Weight percent | 32.9 | 67.7 |
| Membrane phase | | |
| Weight percent | 0 | 7.9 |
| Fat, weight % | — | 52.5 |
| Cholesterol, grams | | 1.48 |
| Product phase | | |
| Weight percent | 67.1 | 24.4 |
| Fat, weight % | 52.8 | 8.9 |
| Cholesterol, grams | 8.11 | 1.10 |
| Cholesterol Reduction, % | 21 | 89 |

EXAMPLE 2

The method described in Example 1 was repeated utilizing 8 percent sunflower monoglycerides, except that the extraction was carried out at temperatures of 54°, 57°, 60° C., and 63° C. The data in Table 2 below illustrate the efficacy of the method of the invention. The data at 63° C. are not presented because some protein denaturation occurred, together with an increase in viscosity.

TABLE 2

| Temperature, °C. | 54 | 57 | 60 |
| --- | --- | --- | --- |
| Cholesterol in starting untreated yolk, grams | 9.42 | 9.42 | 9.42 |
| Fractions recovered after centrifugation | | | |
| Oil phase Weight percent | 60.9 | 65.5 | 66.1 |
| Membrane phase | | | |
| Weight percent | 6.5 | 5.5 | 6.7 |
| Fat, wt % | 55.2 | 57.8 | 53.4 |
| Cholesterol, grams | 1.28 | 1.06 | 1.16 |
| Product phase | | | |
| Weight percent | 32.6 | 29.0 | 27.2 |
| Fat, wt % | 10.8 | 8.72 | 9.6 |
| Cholesterol, grams | 1.71 | 0.88 | 0.87 |
| Cholesterol Reduction, % | 82 | 91 | 91 |

EXAMPLE 3

Dilute destabilized yolk mixture solution was prepared as described in Example 1. Two-hundred fifty gram aliquots of the suspension were mixed with 312.5 grams of sunflower oil containing 8 wt percent monoglyceride, then homogenized and stirred to extract cholesterol from the yolk. The length of the extraction period was varied from less than 30 seconds to 30 minutes. The data summarized in Table 3 below illustrate the relationship between extraction period length and percent cholesterol removal.

TABLE 3

| | Extraction Time | | |
| --- | --- | --- | --- |
| Time (min) | 0* | 15 | 30 |
| Cholesterol in untreated yolk, grams | 1.50 | 1.50 | 1.50 |
| Fractions recovered after centrifugation | | | |
| Oil phase Weight percent | 53.7 | 58.5 | 59.7 |
| Membrane phase Weight percent | 4.8 | 5.5 | 6.4 |

TABLE 3-continued

| Product phase | Extraction Time | | |
|---|---|---|---|
| Weight percent | 41.5 | 36.0 | 33.9 |
| Fat, wt % | 19.6 | 9.8 | 9.0 |
| Cholesterol, grams | 0.86 | 0.25 | 0.18 |
| Cholesterol Reduction, % | 43 | 83 | 88 |

*Less than 30 seconds

EXAMPLE 4

To evaluate the effect of oil-to-egg ratio on cholesterol reduction, dilute destabilized yolk was prepared as described in Example 1. The monoglyceride weight was held constant at 160 g and the vegetable oil weight was varied. Emulsification was carried out in a two-stage homogenizer using a model 15M-8TA homogenizer from Gaulin Corporation. The homogenizer was operated at 1000 psi on the first stage and no pressure on the second stage.

TABLE 4

| Oil, grams (Includes monoglyceride) | 500 | 1000 | 2000 |
|---|---|---|---|
| Cholesterol in untreated yolk, grams | 11.3 | 11.3 | 10.0 |
| Fractions recovered after centrifugation | | | |
| Oil phase | | | |
| Weight percent | 13.3 | 34.6 | 58.8 |
| Membrane phase | | | |
| Weight percent | 32.5 | 22.7 | 7.0 |
| Fat, wt % | 66.8 | 61.4 | 56.6 |
| Cholesterol, grams | 5.74 | 2.97 | 1.38 |
| Product phase | | | |
| Weight percent | 54.2 | 42.7 | 34.2 |
| Fat, wt % | 9.72 | 10.3 | 10.6 |
| Cholesterol, grams | 1.94 | 1.53 | 1.30 |
| Cholesterol Reduction, % | 83 | 86 | 87 |

The data show that, as the oil/monoglyceride-total weight decreased, the egg phase volume decreased and the membrane layer increased. Also, the cholesterol content of the membrane increased significantly with decreasing oil volume. All three indicate that good cholesterol reductions are obtained but better yields and reductions were obtained at the higher oil-to-egg ratios.

EXAMPLE 5

Reduced cholesterol egg solution as prepared in Example 3 at 30 minutes extraction time was concentrated on a rotating evaporator to remove some added water. Additional sunflower oil was added such that the protein, fat, and total solids were equal to that of commercial egg yolk. This was then homogenized to thoroughly mix in the oil, then added to egg whites along with natural flavorings and condiments. A scrambled egg product was prepared that had very acceptable texture and flavor when compared to whole eggs.

Although preferred embodiments of this invention have been discussed herein, those skilled in the art will appreciate that changes and modifications may be made without departing from the spirit of this invention, as defined in and limited only by the scope of the appended claims.

We claim:

1. A method for removing cholesterol from egg comprising:
    (a) heating an emulsion comprising edible oil containing at least about 5 wt percent monoglycerides, based on the weight of the oil, and a mixture of cholesterol-containing egg in aqueous solution to a temperature below about 70° C.;
    (b) agitating the emulsion of step (a) with low-energy, low-shear stirring sufficient to ensure intimate admixture of the phases uniformity of temperature for a period sufficient to transfer cholesterol from the aqueous phase to the oil phase and form at least a cholesterol-reduced aqueous phase and a cholesterol-enriched oil phase; and
    (c) recovering the cholesterol-reduced aqueous phase.

2. The method of claim 1 wherein the emulsion of step (a) is heated to a temperature between about 50° and 65° C.

3. The method of claim 1 wherein the emulsion comprises between about 0.25 to 5 weight parts oil per weight of yolk in the cholesterol-containing egg.

4. The method of claim 3 wherein the emulsion comprises between about 0.5 to 4 weight parts oil per weight of yolk in the cholesterol-containing egg.

5. The method of claim 1 wherein the mixture of cholesterol-containing egg in aqueous solution comprises between about 10 and 125 weight percent water, based on the weight of the yolk in the cholesterol-containing egg.

6. The method of claim 1 wherein the aqueous solution of step (a) further comprises salt.

7. The method of claim 1 wherein the edible oil contains between about 5 and 40 wt percent monoglyceride, based on the weight of the oil.

8. The method of claim 7 wherein the edible oil contains between about 6 and 20 wt percent monoglyceride, based on the weight of the oil.

9. The method of claim 1, further comprising recovering a membrane phase and extracting egg protein therefrom.

10. The method of claim 7, further comprising recovering a membrane phase and extracting egg protein therefrom.

11. The method of claim 1 wherein the period of step (b) is between about 5 and 60 minutes.

12. A method for removing cholesterol from egg comprising:
    (a) heating an emulsion comprising edible oil containing at least about 5 wt percent monoglycerides, based on the weight of the oil, and a mixture of cholesterol-containing egg in aqueous solution to a temperature below about 70° C. under conditions sufficient to transfer cholesterol from the aqueous phase to the oil phase and form at least a cholesterol-reduced aqueous phase and a cholesterol-enriched oil phase; and
    (b) recovering the cholesterol-reduced aqueous phase.

13. The method of claim 1 wherein the emulsion comprises between about 0.25 to 5 weight parts oil per weight of yolk in the cholesterol-containing egg.

14. The method of claim 12 wherein the mixture of cholesterol-containing egg in aqueous solution comprises between about 10 and 125 weight percent water, based on the weight of the yolk in the cholesterol-containing egg.

15. The method of claim 12 wherein the aqueous solution of step (a) further comprises salt.

16. The method of claim 12 wherein the edible oil contains between about 5 and 40 wt percent monoglyceride, based on the weight of the oil.

17. The method of claim 12 wherein the emulsion is agitated with low-energy, low-shear stirring for between about 5 and 60 minutes.

18. A method for removing cholesterol from eggs comprising:

(a) heating to a temperature between about 50° to 65° C. an emulsion comprising edible oil containing between about 5 and 40 wt percent monoglyceride, based on the weight of the oil, and a mixture of cholestol-containing egg in aqueous solution;

(b) agitating the emulsion of step (a) with low-energy, low-shear stirring sufficient to ensure intimate admixture of the phases and uniformity of temperature for a period between about 5 and 60 minutes to transfer cholesterol from the aqueous phase to the oil phase and form at least a cholesterol-reduced aqueous phase and a cholesterol-enriched oil phase; and (c) recovering the cholesterol-reduced aqueous phase.

19. The method of claim 18 wherein the emulsion of step (a) comprises between about 0.25 to 5 weight parts oil per weight of yolk in the cholesterol-containing egg.

20. The method of claim 19 wherein the mixture of cholesterol-containing egg in aqueous solution comprises between about 10 and 125 weight percent water, based on the weight of the yolk in the cholesterol-containing egg.

* * * * *